US012683033B2

(12) United States Patent
Aleshin et al.

(10) Patent No.: US 12,683,033 B2
(45) Date of Patent: Jul. 14, 2026

(54) DEBRIS FILTERING ARRANGEMENT FOR NUCLEAR FUEL ASSEMBLY BOTTOM NOZZLE AND BOTTOM NOZZLE INCLUDING SAME

(71) Applicant: Westinghouse Electric Company LLC, Cranberry Township, PA (US)

(72) Inventors: Artem Aleshin, Waukesha, WI (US); Yuriy Aleshin, Cayce, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 32 days.

(21) Appl. No.: 18/359,594

(22) Filed: Jul. 26, 2023

(65) Prior Publication Data

US 2024/0312646 A1 Sep. 19, 2024

Related U.S. Application Data

(62) Division of application No. 16/419,620, filed on May 22, 2019, now abandoned.

(51) Int. Cl.
*G21C 3/33* (2006.01)
*G21C 3/32* (2006.01)

(52) U.S. Cl.
CPC ......... *G21C 3/3206* (2013.01); *G21C 3/3305* (2013.01)

(58) Field of Classification Search
CPC ...... G21C 3/3206; G21C 3/3305; G21C 3/33; B01D 29/50–58
USPC ........................................................ 376/313
See application file for complete search history.

(56) References Cited

U.S. PATENT DOCUMENTS

| | | | |
|---|---|---|---|
| 4,096,032 | A | 6/1978 | Mayers et al. |
| 4,678,627 | A | 7/1987 | Rylatt |
| 4,684,496 | A | 8/1987 | Wilson et al. |
| 4,832,905 | A | 5/1989 | Bryan et al. |
| 4,900,507 | A | 2/1990 | Shallenberger et al. |
| 4,919,883 | A | 4/1990 | Bryan |
| 5,094,802 | A | 3/1992 | Riordan, III |
| 5,180,545 | A | 1/1993 | Grattier |
| 5,225,152 | A | 7/1993 | Verdier |
| 5,243,632 | A | 9/1993 | Badin et al. |
| 5,539,793 | A | 7/1996 | Johansson et al. |
| 5,867,551 | A | 2/1999 | Toshihiko |

(Continued)

FOREIGN PATENT DOCUMENTS

| | | |
|---|---|---|
| JP | H10253786 A | 9/1998 |
| JP | 2005172748 A | 6/2005 |

OTHER PUBLICATIONS

International Search Report and Written Opinion for International PCT Application No. PCT/US2020/034043 dated Nov. 25, 2020.

*Primary Examiner* — Jinney Kil
(74) *Attorney, Agent, or Firm* — K&L Gates LLP

(57) ABSTRACT

A filtering arrangement for use in a bottom nozzle of a fuel assembly in a nuclear reactor includes a top surface, a bottom surface, a plurality of vertical wall portions arranged in a generally squared grid-like pattern which extend between the bottom surface and the top surface and define a plurality of non-circular passages extending between the bottom surface and the top surface through the arrangement, and a plurality of first debris filters which are each positioned between the top surface and the bottom surface to generally span across a respective one of the plurality of passages.

20 Claims, 16 Drawing Sheets

(56) References Cited

U.S. PATENT DOCUMENTS

| | | | |
|---|---|---|---|
| 2003/0128798 A1 | 7/2003 | Kageyama et al. | |
| 2016/0358674 A1 | 12/2016 | Farawila | |
| 2018/0268949 A1 | 9/2018 | Aleshin et al. | |
| 2020/0227180 A1* | 7/2020 | Chun | G21C 3/322 |

* cited by examiner

DEBRIS FILTERING ARRANGEMENT FOR NUCLEAR FUEL ASSEMBLY BOTTOM NOZZLE AND BOTTOM NOZZLE INCLUDING SAME

CROSS-REFERENCE TO RELATED APPLICATION

The present application is a divisional application claiming priority under 35 U.S.C. § 121 to U.S. patent application Ser. No. 16/419,620, entitled DEBRIS FILTERING ARRANGEMENT FOR NUCLEAR FUEL ASSEMBLY BOTTOM NOZZLE AND BOTTOM NOZZLE INCLUDING SAME, filed May 22, 2019, which is incorporated by reference herein in its respective entirety.

BACKGROUND

1. Field

The present invention relates generally to nuclear reactors and, more particularly, relates to debris filtering arrangements for bottom nozzles for use in a nuclear fuel assembly such as employed in a pressurized water reactor (PWR).

2. Related Art

During manufacture and subsequent installation and repair of components comprising a nuclear reactor coolant circulation system, diligent effort is made to assure removal of all debris from the reactor vessel and its associated systems which circulate coolant through it under various operating conditions. Although elaborate procedures are carried out to help assure debris removal, experience shows that in spite of the safeguards used to effect such removal, some small amount of debris, such as metal chips and metal particles still remain hidden in the systems. Most of the debris consists of metal wires, chips and turnings which were probably left in the primary system after steam generator repair or replacement or similar types of plant modifications during the refueling process. It is desirable to ensure that this type of debris does not make its way into the fuel region during plant operation.

In particular, fuel assembly damage due to debris trapped at the lowermost grids has been noted in several reactors in the past. Debris enters through the fuel assembly bottom nozzle flow holes from the coolant flow openings in the lower core support plate when the plant is started up. The debris tends to become lodged in the lowermost support grids of the fuel assembly within the spaces between the "egg-crate" shaped cell walls of the grid and the lower end portions of the fuel rod tubes. The damage consists of fuel rod tube perforations caused by fretting of debris in contact with the exterior of the fuel tube. Debris can also become entangled in the nozzle plate holes and the flowing coolant causes the debris to gyrate which tends to cut through the cladding of the fuel rods.

Several different approaches have been proposed and tried for carrying out removal of debris from nuclear reactors. Many of these approaches are discussed in U.S. Pat. No. 4,096,032 to Mayers et al. U.S. Pat. No. 4,900,507 to Shallenberger et al. illustrates another approach. Yet other approaches use mesh spires which protrude out of the body of the nozzle. However, such designs run the risk of interfering with the fuel rods and have debris capturing features that may potentially be damaged during transportation and assembly.

While some of the aforementioned approaches operate reasonably well and generally achieve their objectives under the range of operating conditions for which they were designed, a need still exists for improved solutions to the problem of debris filtering in nuclear reactors. New approaches must be compatible with the existing structure and operation of the components of the reactor, be effective throughout the operating cycle of the reactor, and at least provide overall benefits which outweigh any costs added.

SUMMARY

Embodiments of the concept as described herein provide an improved debris capturing feature for a fuel assembly, such as used in a pressurized water reactor (PWR), while at the same time minimizing pressure drop when compared to existing bottom nozzle designs. Embodiments of the invention utilize unique debris capturing features which are also designed to streamline the flow passages thereby resulting in a reduced pressure loss coefficient. The design is especially effective at the higher flow rates associated with the conditions standard commercial PWR nuclear reactors see during normal operating conditions.

As one aspect, a filtering arrangement for use in a bottom nozzle of a fuel assembly in a nuclear reactor is provided. The filtering arrangement comprises: a top surface; a bottom surface; a plurality of vertical wall portions arranged in a generally squared grid-like pattern which extend between the bottom surface and the top surface and define a plurality of non-circular passages extending between the bottom surface and the top surface through the arrangement; and a plurality of first debris filters, each debris filter being positioned between the top surface and the bottom surface to generally span across a respective one of the plurality of passages.

Each first debris filter may comprise a hollow pyramid or hollow cone-like structure formed from a lattice structure which is sized and configured to minimize resistance in regard to coolant flow through the lattice structure.

When viewed from directly above the filtering arrangement or directly below the filtering arrangement the lattice structure of each first debris filter may be arranged so as to form a first squared grid-like pattern.

At least one first debris filter may narrow from bottom to top.

At least one first debris filter may narrow from top to bottom.

The filtering arrangement may further comprise a plurality of second debris filters which are each positioned between the top surface and the first debris filter to generally span across a respective one of the plurality of passages.

Each first debris filter may comprise a hollow pyramid or hollow cone-like structure formed from a lattice structure which is sized and configured to minimize resistance in regard to coolant flow through the lattice structure and each second debris filter may comprise a hollow pyramid or hollow cone-like structure formed from a lattice structure which is sized and configured to minimize resistance in regard to coolant flow through the lattice structure.

When viewed from directly above the filtering arrangement or directly below the filtering arrangement the lattice structure of each second debris filter may be arranged so as to form a second squared grid-like pattern.

When viewed from above, the second squared grid-like pattern may be offset a distance from the first squared grid-like pattern.

At least one first debris filter may narrow from bottom to top and at least one second debris filter may narrow from bottom to top.

At least one first debris filter may narrow from top to bottom and at least one second debris filter may narrow from top to bottom.

As another aspect, a bottom nozzle assembly for use in a fuel assembly in a nuclear reactor is provided. The bottom nozzle assembly comprises: a generally rectangular skirt portion and a filtering arrangement as previously described coupled to the generally rectangular base portion.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A further understanding of the invention can be gained from the following description of the preferred embodiments when read in conjunction with the accompanying drawings in which.

DETAILED DESCRIPTION

Figure 1:
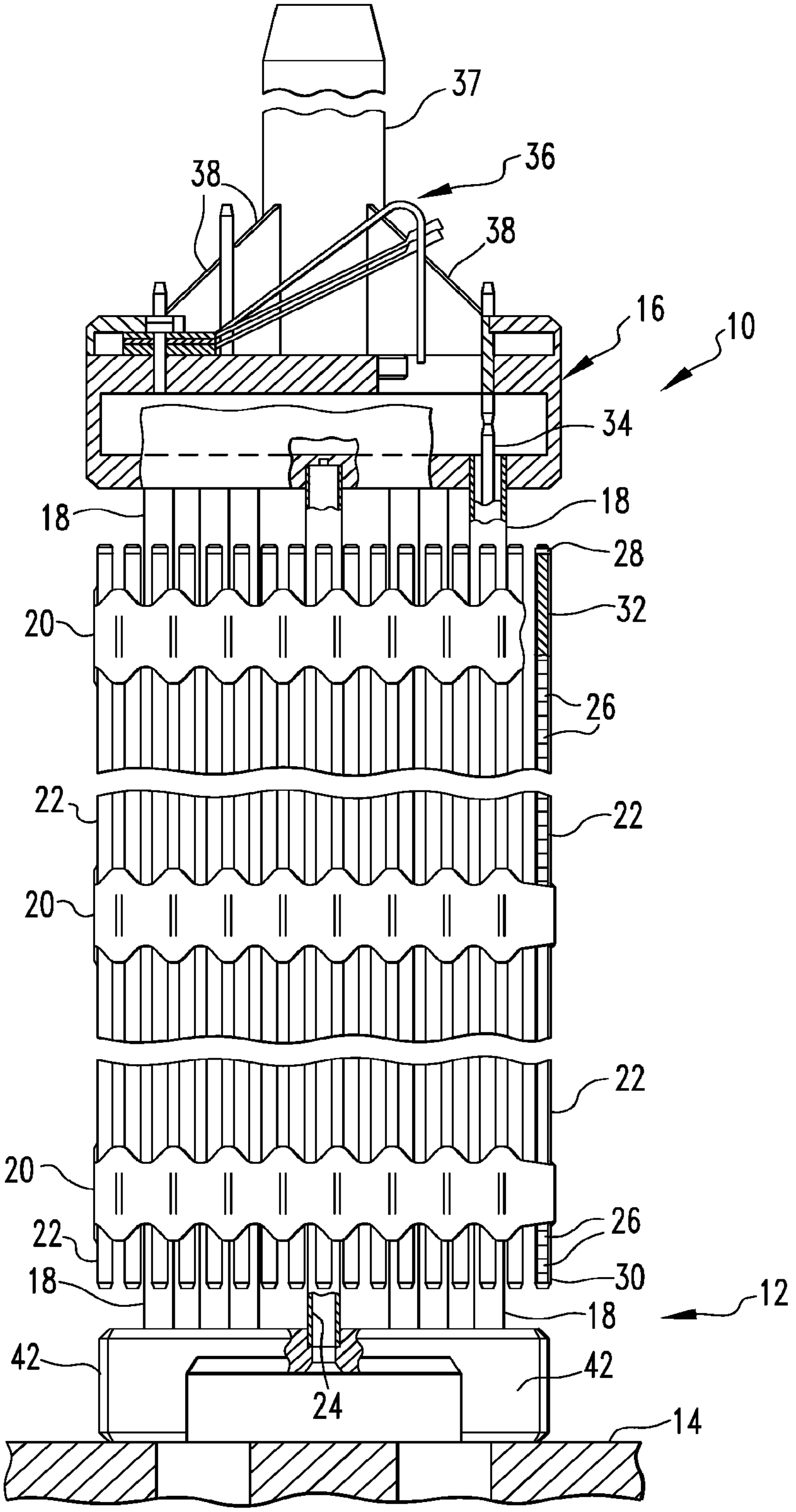
FIG. 1 PRIOR ART
FIG. 1 is an elevational view, partly in section, of a conventional fuel assembly including a conventional debris filter bottom nozzle, the assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Referring now to the drawings, FIG. 1 shows an elevational view of a prior art fuel assembly, represented in vertically foreshortened form and being generally designated by the numeral 10, in which embodiments of the present invention may be employed. The fuel assembly 10 is the type used in a pressurized water reactor and has a structural skeleton which at its lower end includes a debris filter bottom nozzle 12 such as described in U.S. Pat. No. 4,900,507. The bottom nozzle 12 supports the fuel assembly 10 on a lower core support plate 14 in the core region of a reactor (not shown). In addition to the bottom nozzle 12, the structural skeleton of the fuel assembly 10 also includes a top nozzle 16 at its upper end and a number of guide tubes or thimbles 18 which extend longitudinally between the bottom and top nozzles 12, 16 and at opposite ends are attached thereto.

The fuel assembly 10 further includes a plurality of transverse grids 20 axially spaced along and mounted to the guide thimbles 18 and an organized array of elongated fuel rods 22 transversely spaced and supported by the grids 20. Also, the assembly 10 has an instrumentation tube 24 located in the center thereof and extending between and mounted to the bottom and top nozzles 12, 16. With such an arrangement of parts, the fuel assembly 10 forms an integral unit capable of being conveniently handled without damaging the assembly parts.

As mentioned above, the fuel rods 22 in the array thereof in the assembly 10 are held in spaced relationship with one another by the grids 20 spaced along the fuel assembly length. Each fuel rod 22 includes nuclear fuel pellets 26 and is closed at its opposite ends by upper and lower end plugs 28, 30. The pellets 26 are maintained in a stack thereof by a plenum spring 32 disposed between the upper end plug 28 and the top of the pellet stack. The fuel pellets 26 composed of fissile material are responsible for creating the reactive power of the reactor. A liquid moderator/coolant such as water, or water containing boron, is pumped upwardly through a plurality of flow openings (not numbered) in the lower core plate 14 to the fuel assembly. The bottom nozzle 12 of the fuel assembly 10 passes the coolant flow along the fuel rods 22 of the assembly in order to extract heat generated therein for the production of useful work.

In order to control the fission process, a number of control rods 34 are reciprocally movable in the guide thimbles 18 located at predetermined positions in the fuel assembly 10. Specifically, a rod cluster control mechanism 36 positioned above the top nozzle 16 supports the control rods 34. The control mechanism has an internally threaded cylindrical member 37 with a plurality of radially extending flukes or arms 38. Each arm 38 is interconnected to a control rod 34 such that the control mechanism 36 is operable to move the control rods vertically in the guide thimbles 18 to thereby control the fission process in the fuel assembly 10, all in a well-known manner.

As mentioned above, fuel assembly damage due to debris trapped at or below the lowermost grids 20 has been found to be a problem. Therefore, to prevent occurrence of such damage, it is highly desirable to prevent such debris from passing through the bottom nozzle flow holes and reaching the fuel bundle region.

Figure 2:
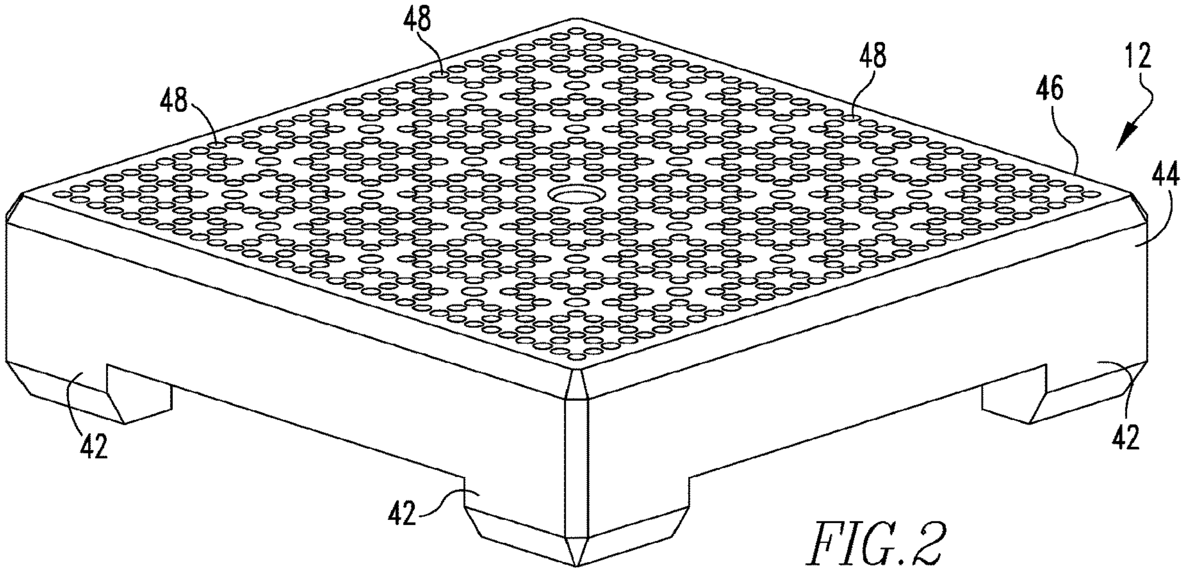
FIG.2 PRIOR ART
FIG. 2 is an isometric view of the conventional debris filter bottom nozzle of the fuel assembly of FIG. 1.
Figure 3:
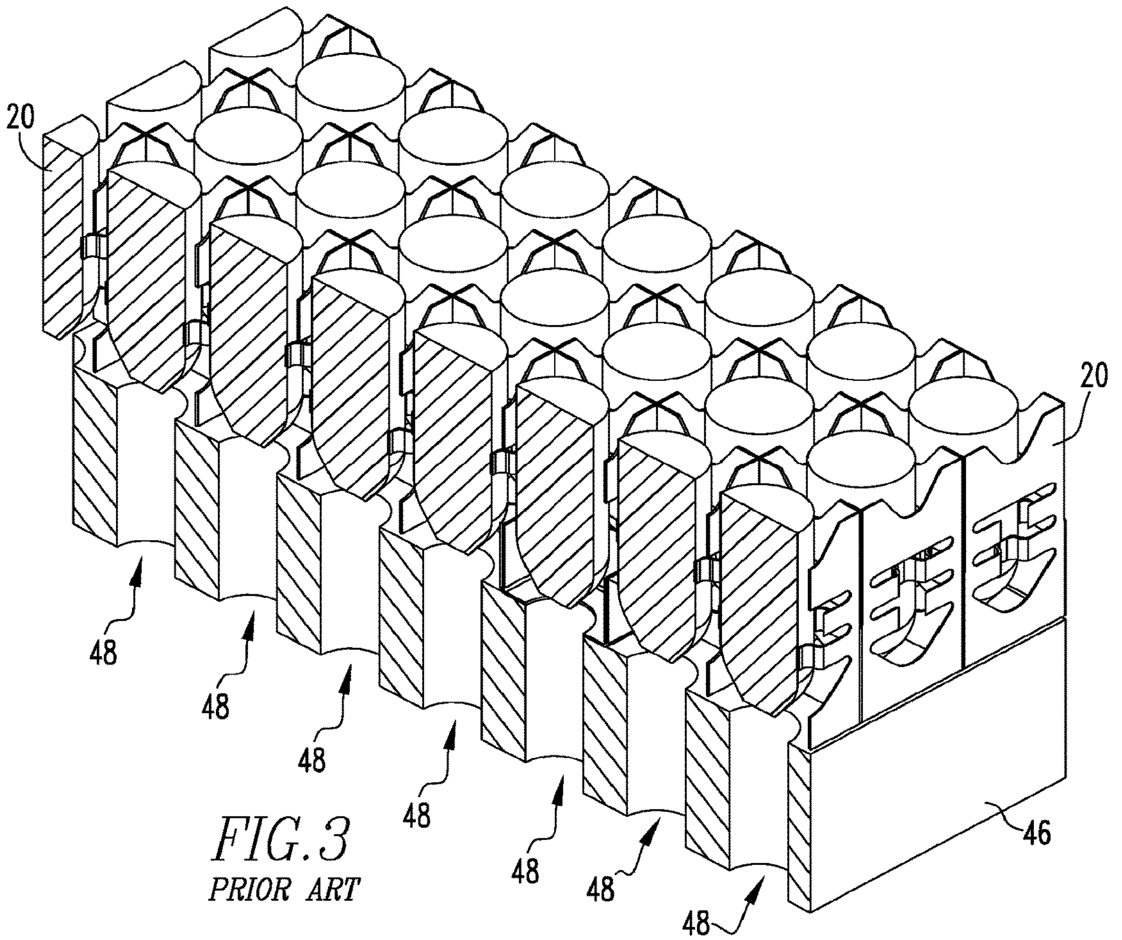
FIG.3 PRIOR ART
FIG. 3 is a section view of a generally central portion of a debris filter bottom nozzle of such as shown in FIG. 2 shown with example fuel rods (shown schematically in section) disposed on the flow plate of the bottom nozzle along with straps of a support grid disposed about the fuel rods and resting on the flow plate.
Figure 4:
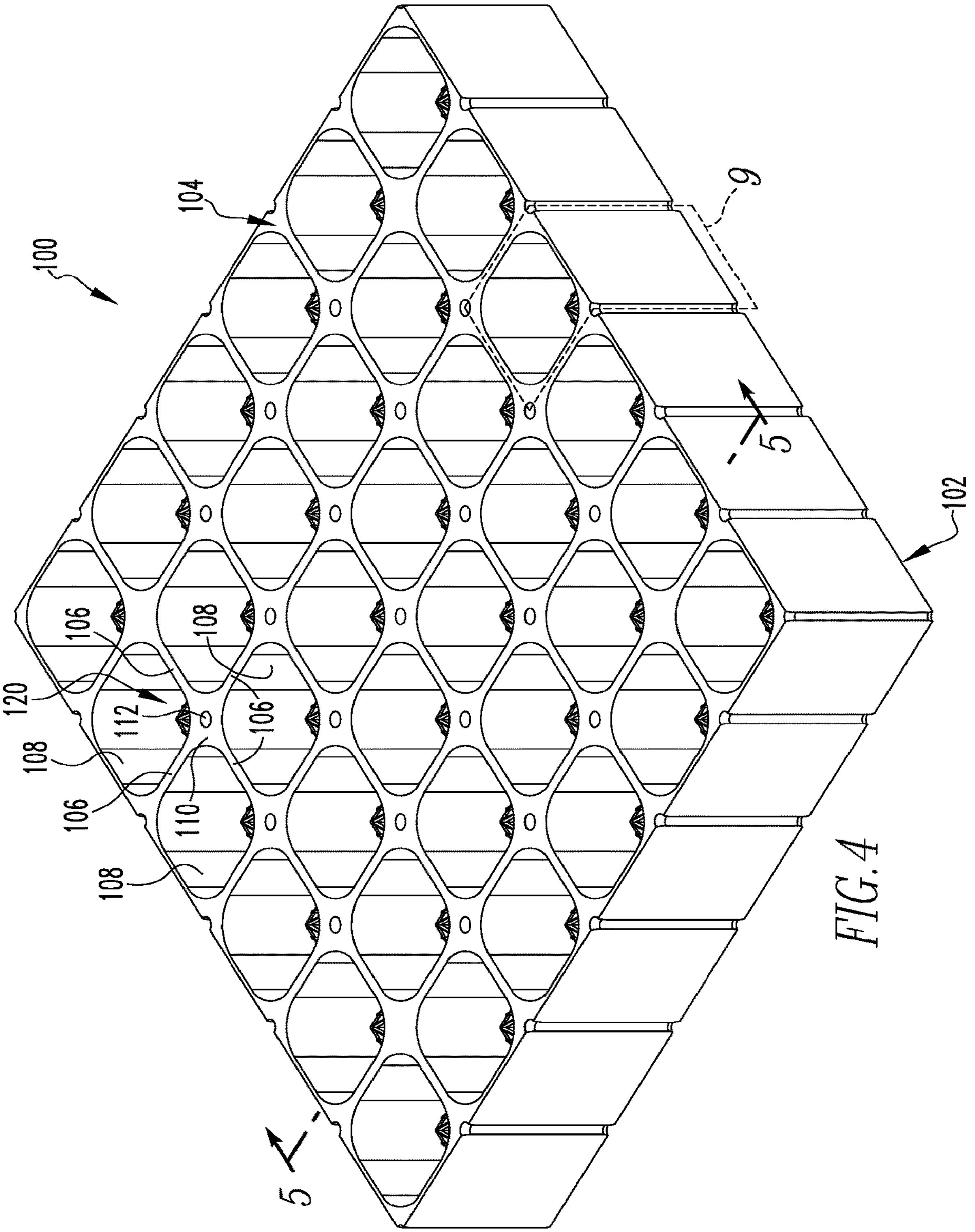
FIG. 4 is a perspective view of a filtering arrangement in accordance with an example embodiment of the present invention.
Figure 5:
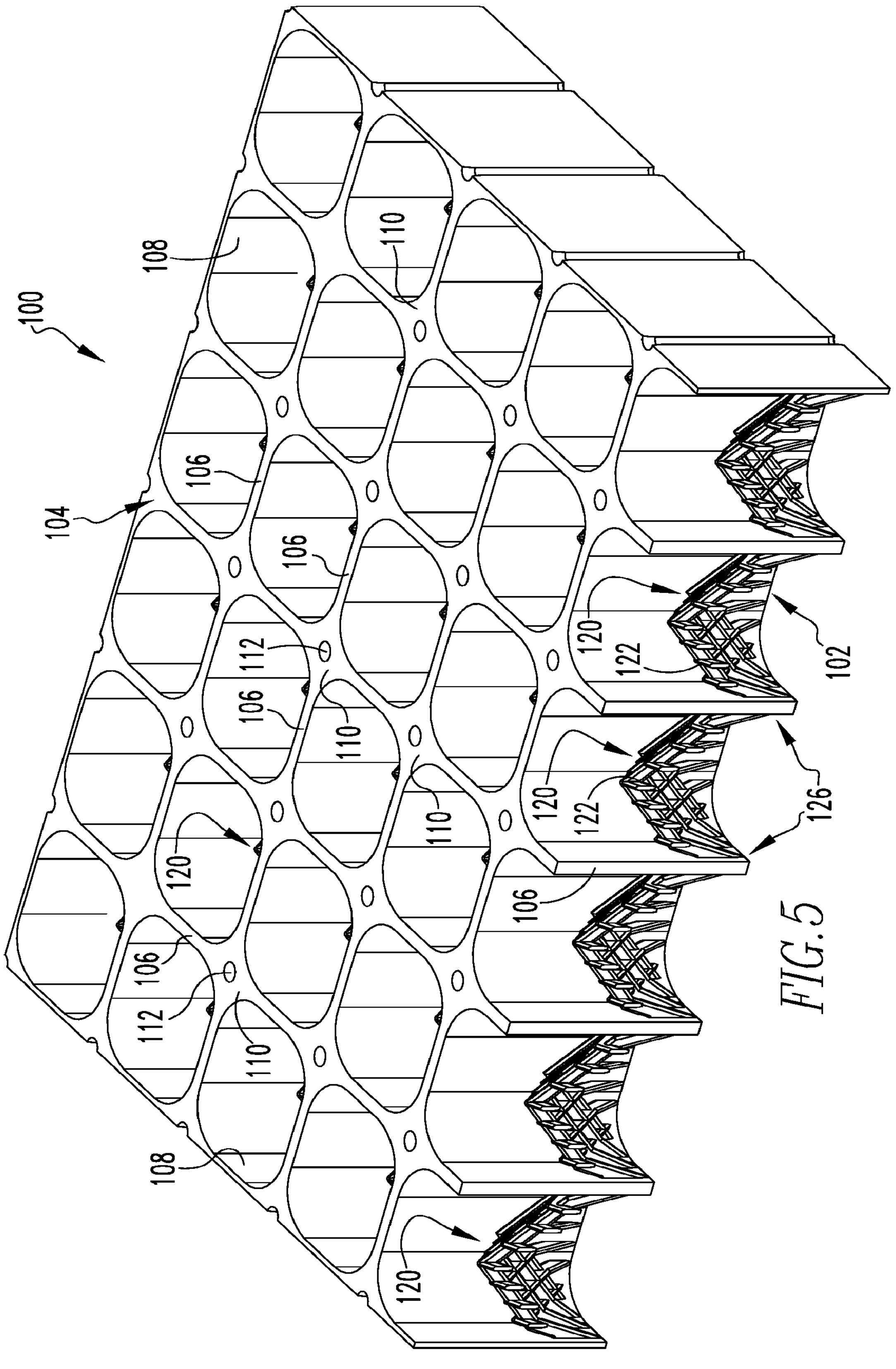
FIG. 5 is another perspective view of the filtering arrangement of FIG. 4 shown sectioned along line 5-5 of FIG. 4.
Figure 6:
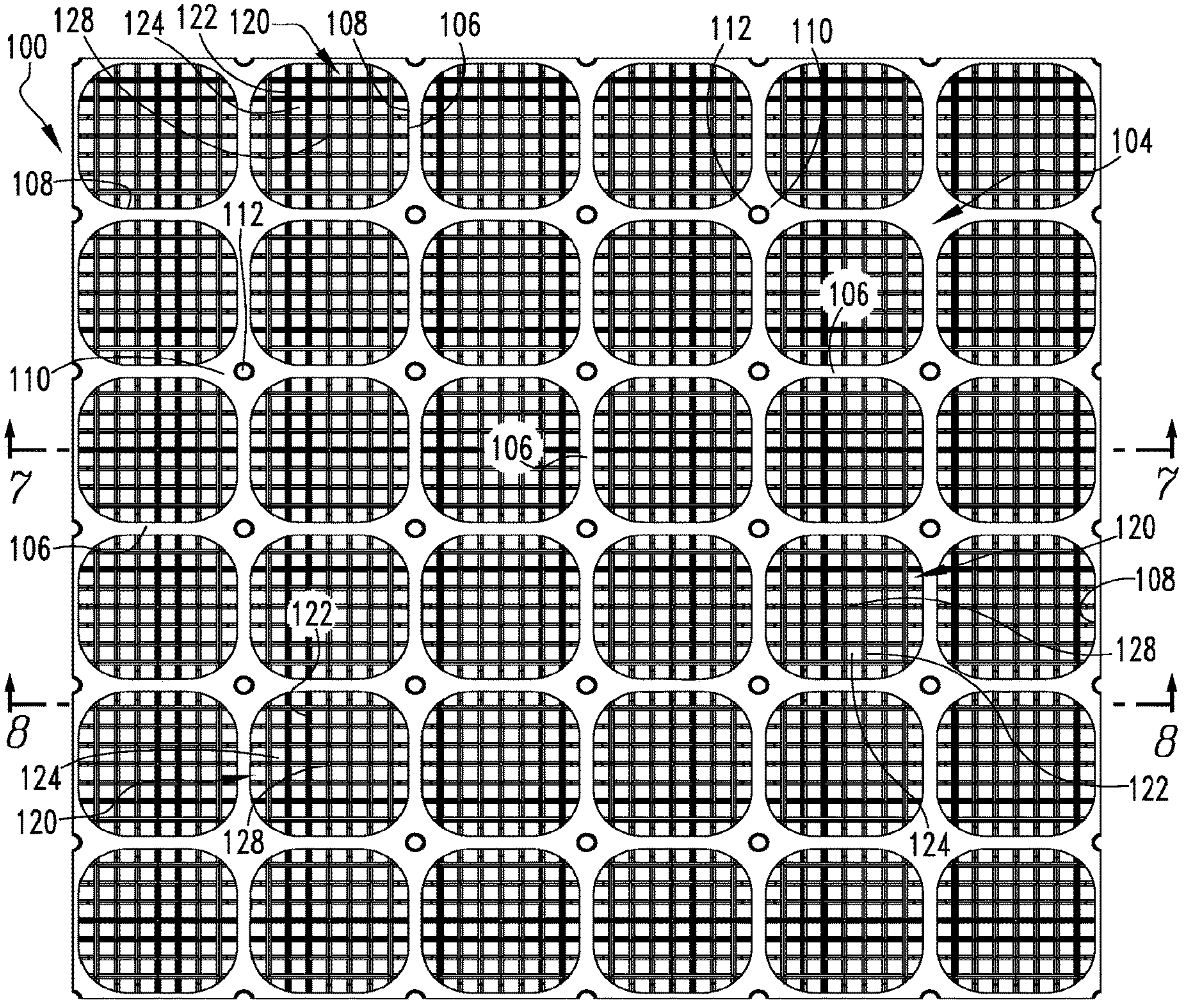
FIG. 6 is a top view of the filtering arrangement of FIG. 4.
Figure 7:
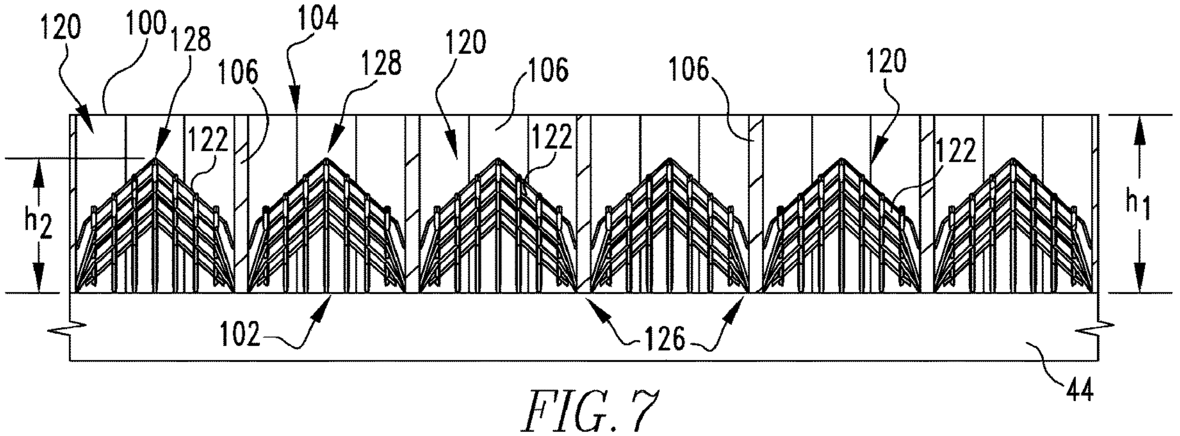
FIG. 7 is a sectional elevation view of the filtering arrangement of FIG. 4 taken along line 7-7 of FIG. 6.
Figure 8:
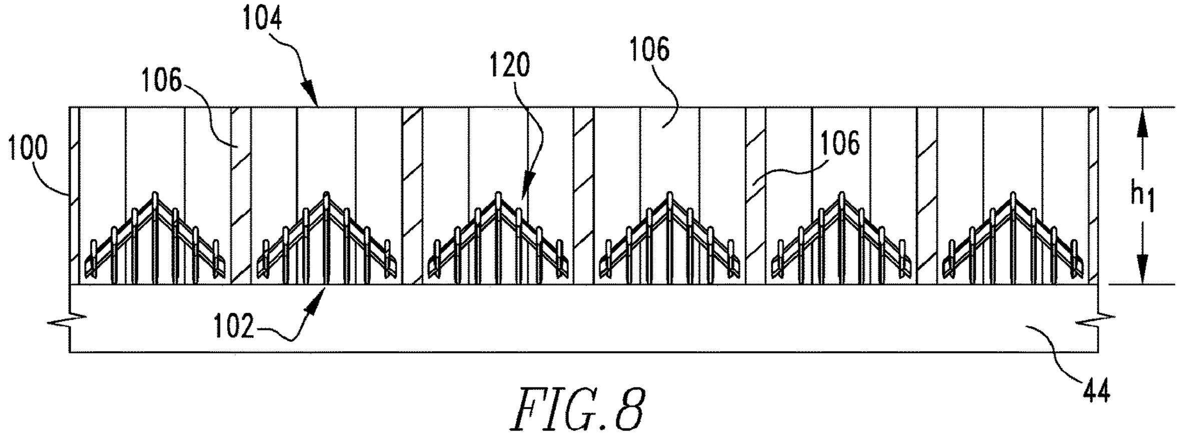
FIG. 8 is another sectional elevation view of the filtering arrangement of FIG. 4 taken along line 8-8 of FIG. 6.
Figure 9:
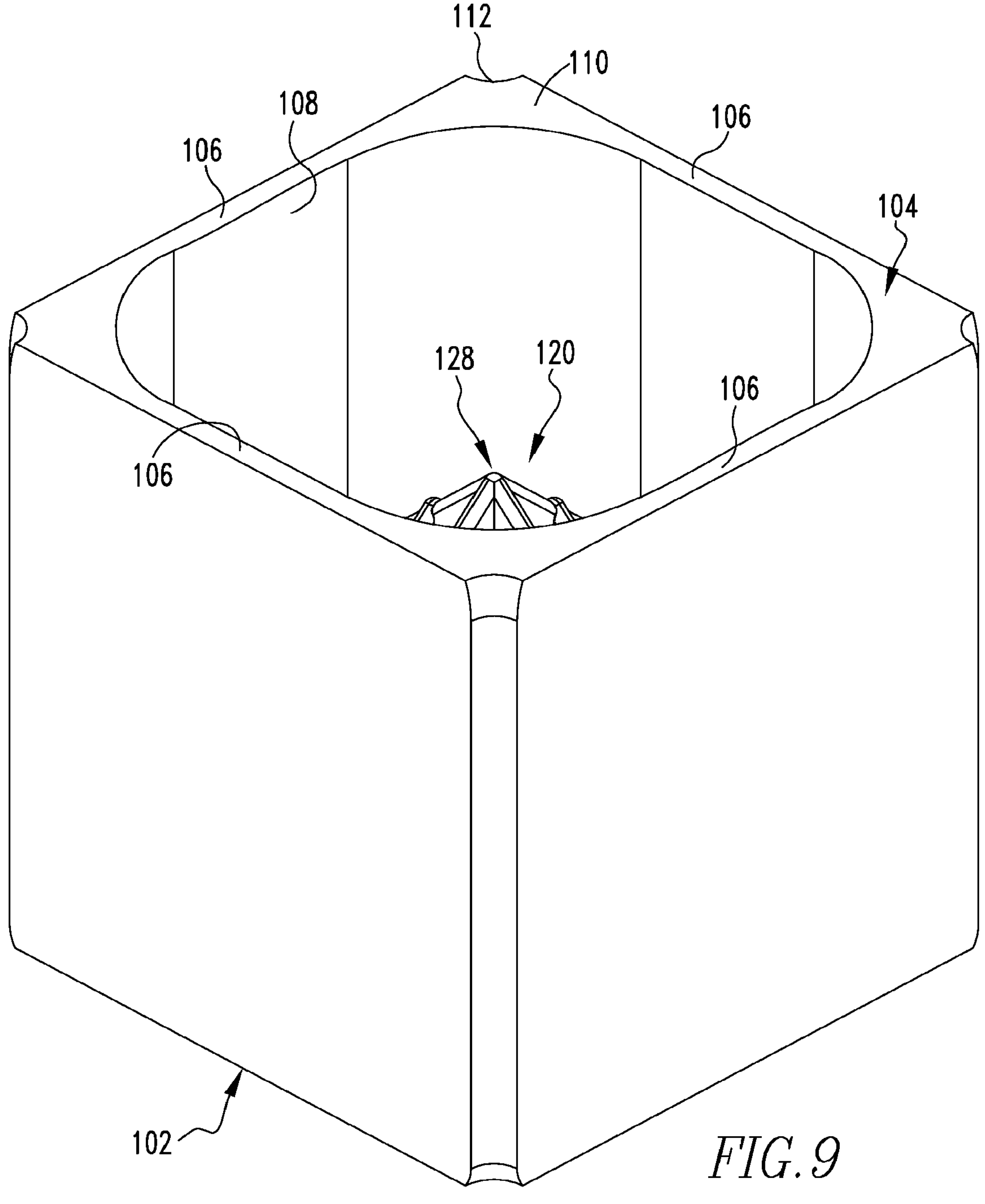
FIG. 9 is an enlarged perspective view of a representative repeating unit of the filtering arrangement of FIG. 4 as indicated at 9.
Figure 10:
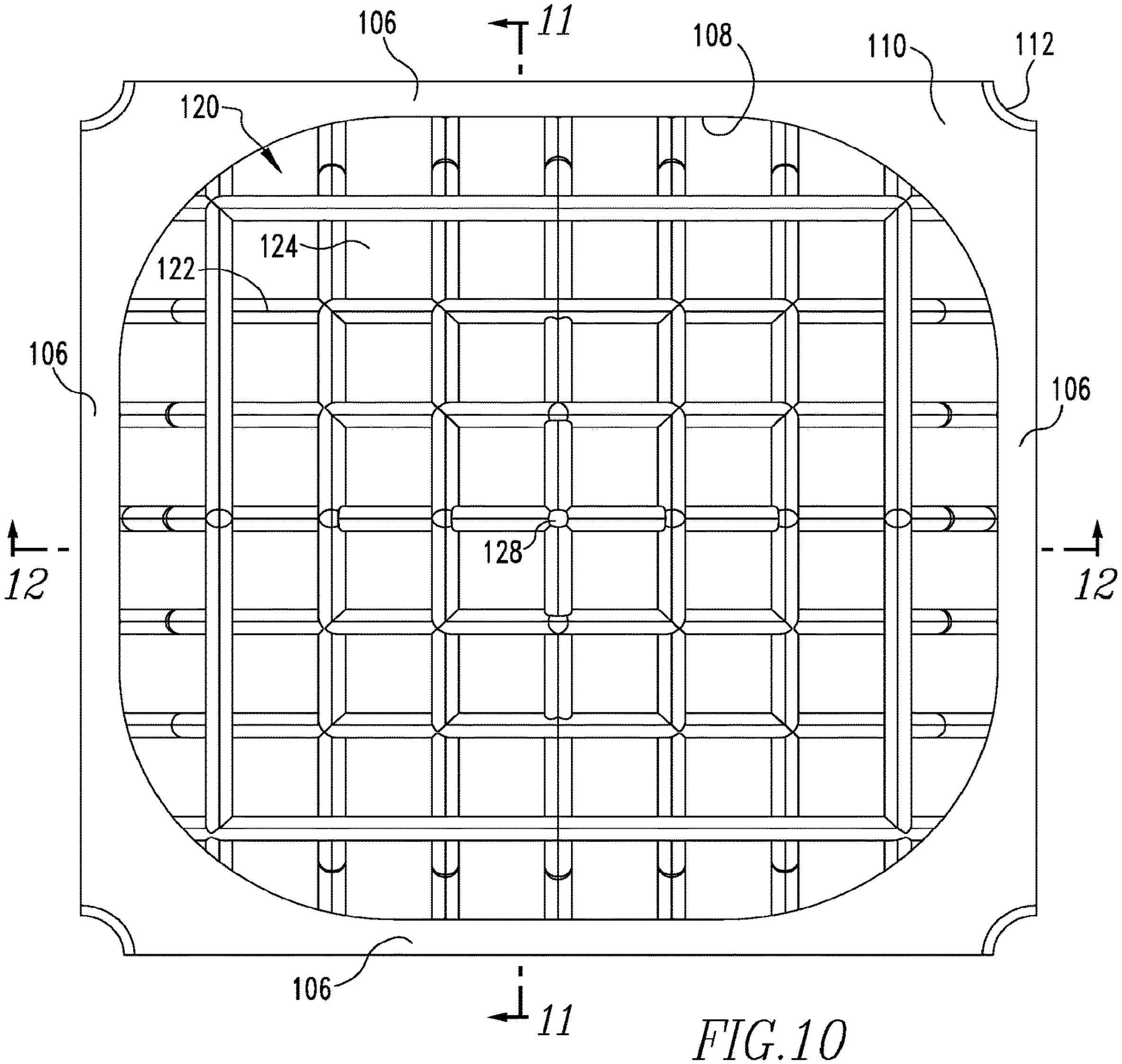
FIG. 10 is a top view of the repeating unit of FIG. 9.
Figure 11:
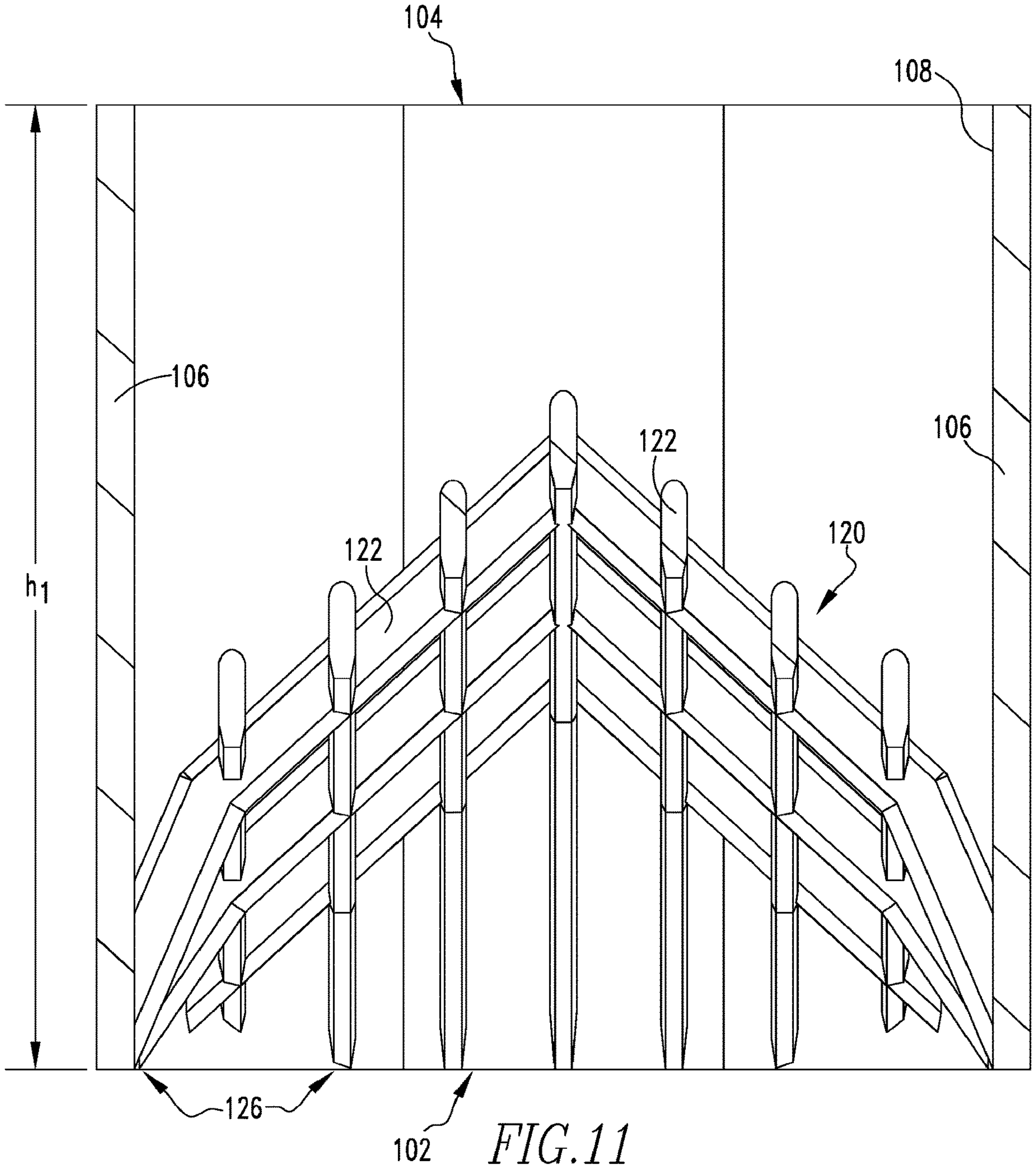
FIG. 11 is a sectional elevation view of the repeating unit of FIG. 9 taken along line 11-11 of FIG. 10.
Figure 12:
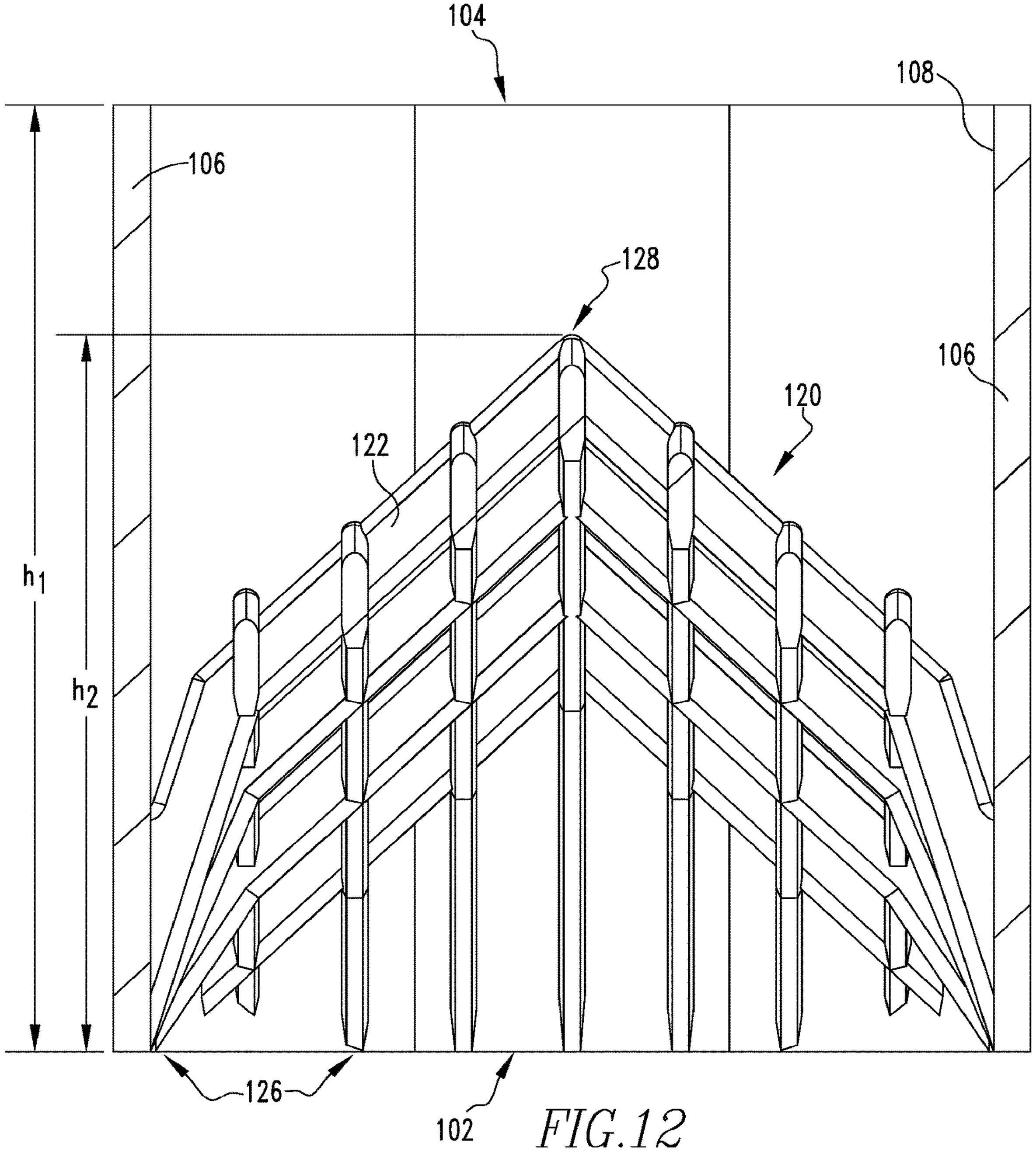
FIG. 12 is a sectional elevation view of the repeating unit of FIG. 9 taken along line 12-12 of FIG. 10.
Figure 13:
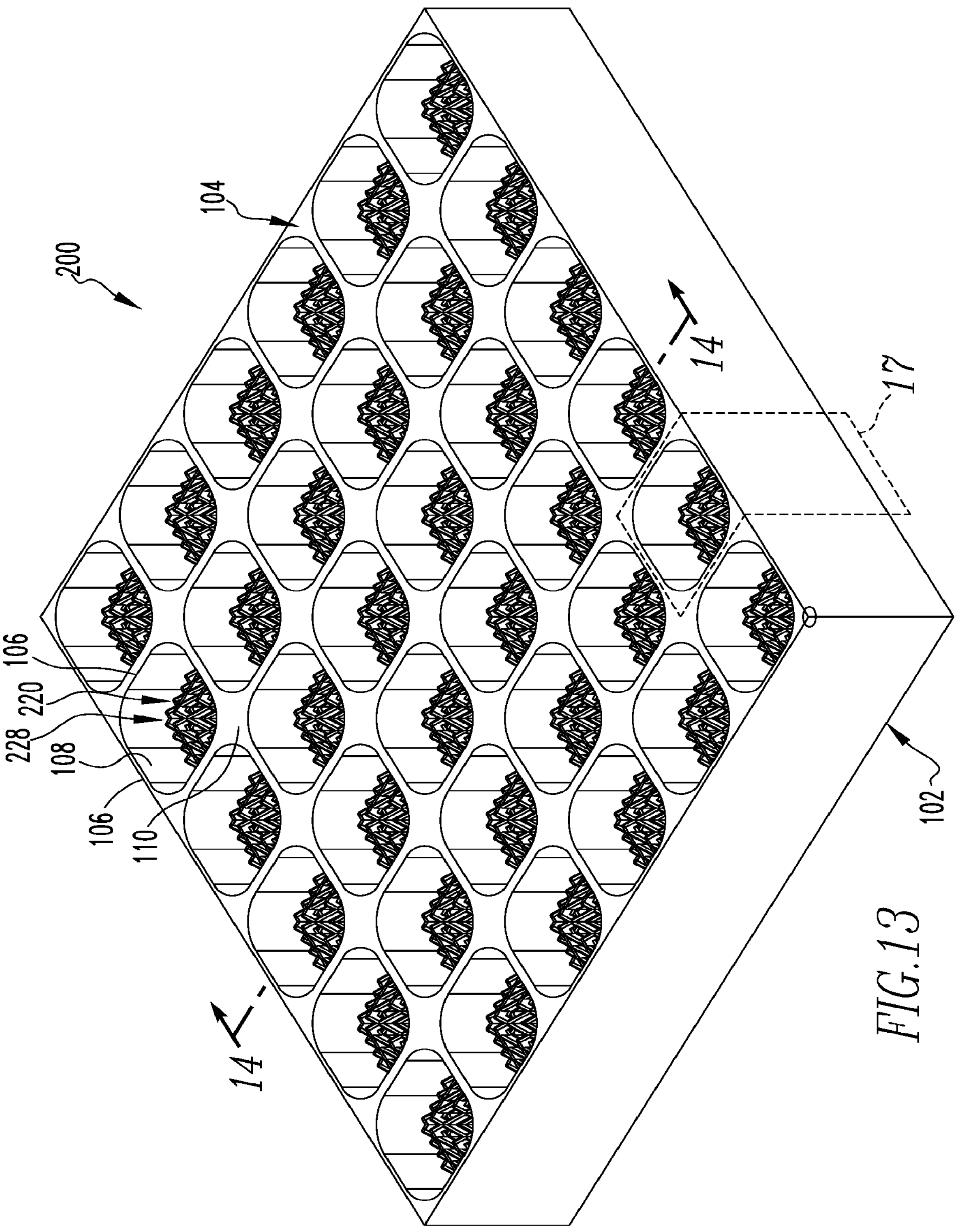
FIG. 13 is a perspective view of another filtering arrangement in accordance with another example embodiment of the present invention.
Figure 14:
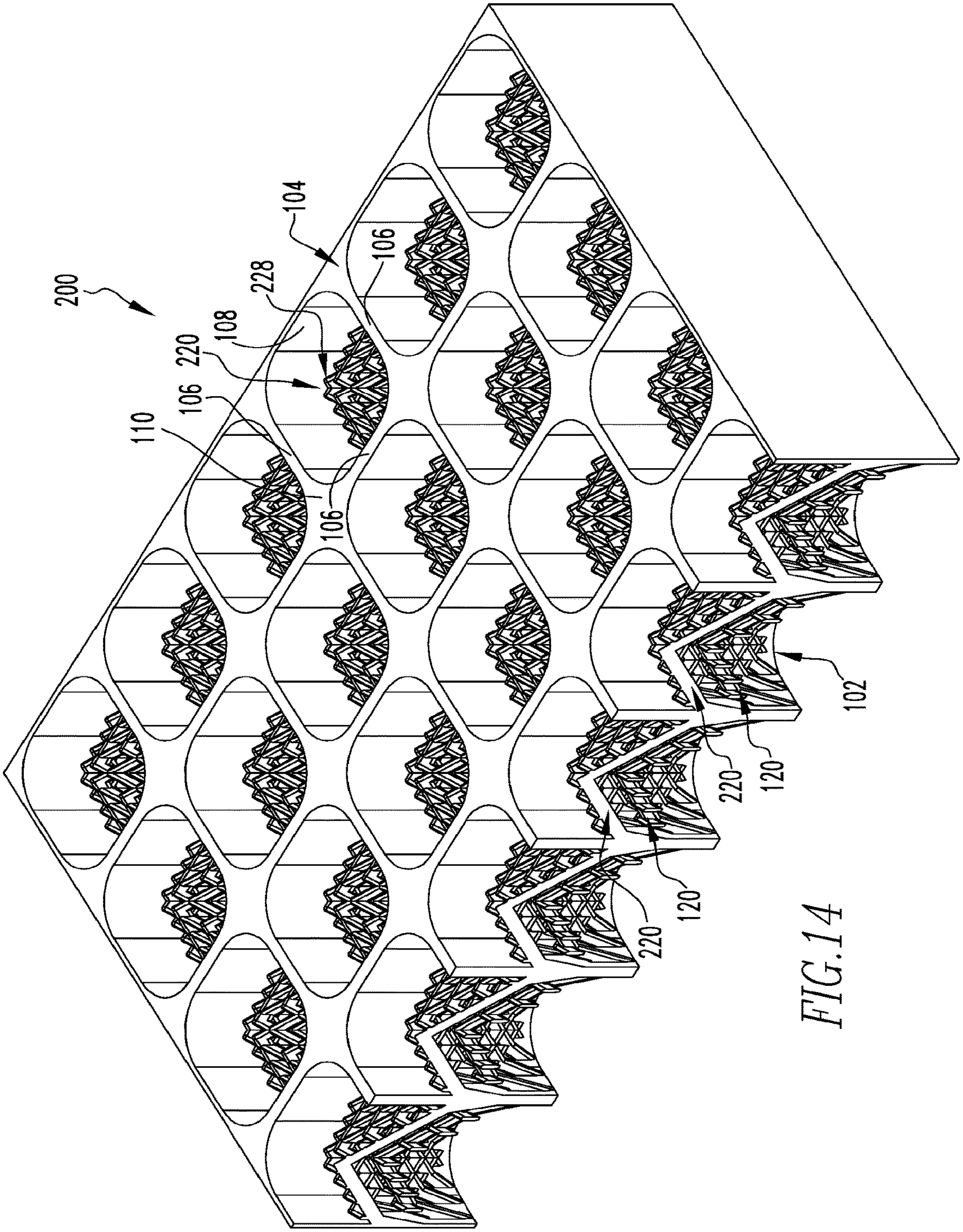
FIG. 14 is another perspective view of the filtering arrangement of FIG. 13 shown sectioned along line 14-14 of FIG. 13.

Referring now to FIG. 2, the conventional bottom nozzle 12 includes support means in the form of a plurality of corner legs 42 which extend from a generally rectangular skirt portion 44. The corner legs 42 support the fuel assembly 10 on the lower core plate 14. Bottom nozzle 12 further includes a generally rectangular planar plate 46 which is suitably attached, such as by welding, to the skirt portion 44. As seen in FIGS. 2 and 3, the conventional bottom nozzle 12 has a plate 46 with a plurality of spaced flow holes 48. The flow holes 48 are sized to "filter out" damaging-size debris. Such a design is intended to perform such filtering without appreciably affecting flow or pressure drop through the plate 46 and the fuel assembly 10.

The diameter of the flow holes 48, as shown in the partial section view of plate 46 in FIG. 3, does not allow passage of debris that is of the size typically caught in the lowermost support grids 20. If the debris is small enough to pass through these plate flow holes 48, it is likely that it will also pass through the grids 20 since the diameter of the flow holes 48 is smaller than the largest cross-sectional dimension of the unoccupied spaces through a cell of the support grid 20. Such unoccupied spaces are typically found in adjacent corners formed by the interleaved straps which compose the grid 20. By ensuring that the debris is small enough to pass through the grid spaces, the conventional debris filter bottom nozzle 12 thereby significantly reduces the potential for debris-induced fuel rod failures. However, while generally suitable for its intended purpose, the conventional debris filter bottom nozzle 12 allows for debris with minimum dimension of ~0.200" and below to pass and still has room for improvement.

Embodiments of the present invention generally replace the plate 46 of the conventional debris filter bottom nozzle 12 of FIGS. 1-3 with an arrangement that results in a lower pressure drop as compared to conventional plate 46, while also improving filtering capability. Additionally, embodiments of the present invention provide for filtering arrangements which may be tuned in order to match the pressure drop of an existing fuel assembly bottom nozzle.

Having thus described the conventional arrangement in which embodiments of the present invention improve upon, an example embodiment of an improved filtering arrangement 100 in accordance with one example embodiment of the present invention will now be described in conjunction with FIGS. 4-12 which show various representative views of filtering arrangement 100 and portions thereof.

Referring first to FIGS. 4-8, various views of a representative portion of an improved filtering arrangement 100 in accordance with one example embodiment of the present invention are shown. Arrangement 100 overall is formed as a generally planar structure which in use is structured to be coupled to a skirt portion, such as skirt portion 44 (previously discussed in regard to FIGS. 1-3 and shown schematically in FIGS. 7 and 8), via welding or other suitable mechanism or mechanisms. Arrangement 100 includes a bottom surface 102, a top surface 104 disposed parallel to bottom surface 102, and a plurality of vertical wall portions 106 which extend a height $h_1$ between bottom surface 102 and top surface 104. As perhaps best shown in the top view of FIG. 6, wall portions 106 are arranged generally in a generally squared grid-like pattern which defines a plurality of non-circular passages 108 extending between bottom surface 102 and top surface 104 through arrangement 100. The areas 110 of the grid-like pattern where wall portions 106 intersect are generally slightly thickened to provide for the formation of optional flow holes 112 (i.e. venturi or straight hole with chamfers) (e.g., without limitation, having a diameter in the range of about 0.020" to about 0.200") which extend vertically through arrangement 100 and are each positioned to be centered under an end portion of a corresponding fuel rod positioned thereabove. As used herein, "grid-like" shall be used to refer to an arrangement of elements which are laid out in a manner which is similar to a pattern of a grid. Each of venturi flow holes 112 may include a tapered inlet and outlet so as to minimize undesirable turbulence and/or pressure drop of fluid passing therethrough. It is to be appreciated that the general structure of filtering arrangement 100 thus far described provides for a rigid structure while generally minimizing the area of the coolant flow potentially impeded thereby.

Continuing to refer to FIGS. 4-8, filtering arrangement 100 further includes a plurality of debris filters 120, each positioned within a respective passage 108 so as to generally span across each passage 108 between wall portions 106 that define the each particular passage 108. Each debris filter 120 is formed generally as a hollow pyramid or hollow cone-like structure (or other suitable three-dimensional arrangement) which is formed from a lattice structure 122 that is sized and configured to minimize resistance in regard to coolant flow through it, and thus minimize pressure drop, while also prohibiting debris larger than a predetermined size (e.g., without limitation, in the range of from about 0.040" to 0.100") from passing through a plurality of apertures 124 defined by lattice structure 122. In example embodiments of the present concept, lattice structures having a width (measured in the horizontal direction) in the range of about 0.005" to about 0.075" and thickness (measured in the vertical direction) in the range of about 0.010" to 0.100" have been employed, although lattice structures of other dimensions may be employed without varying from the scope of the present concept.

Each debris filter 120 extends a height $h_2$ upward from a base 126 thereof, which may generally coincide with bottom surface 102 or which may be located upward therefrom, to an apex portion 128, which may be disposed at, or below, top surface 104. In other words, each debris filter 120 is positioned between bottom and top surfaces 102 and 104 so as to not protrude beyond either of surfaces 102 or 104 and thus have a height $h_2$ less than, or at most equal to, height $h_1$ of filtering arrangement 100. Although illustrated in the example embodiments herein as being of a "tip up" orientation (i.e., narrowing from bottom to top), it is to be appreciated that each debris filter may alternatively be oriented in a "tip down" orientation (i.e., narrowing from the top down) without varying from the scope of the disclosed concept. In accordance with such an alternative, e.g., FIG. 6 may be regarded as a bottom view of a filtering arrangement 100 in which each debris filter 120 is oriented in a "tip down" orientation.

In example embodiments of the present concept, debris filters 120 having a height $h_2$ in the range of about 0.250" to about 0.600" have been employed, although other heights may be employed without varying from the scope of the present concept. Accordingly, when viewed in the top view of arrangement 100 shown in FIG. 6, each debris filter 120 (only three of which are generally labeled in FIG. 6) extends outward in the FIG. (i.e., upward from the plane of the page among the surrounding wall portions 106). As can be appreciated from the top view of FIG. 6, lattice structures 122 which form each of debris filters 120 are formed so as to form a squared grid-like pattern when viewed in a direction parallel to the general flow of coolant through arrangement 100. In example embodiments of the present concept, grid dimensions in the range of from about 0.250"×0.250" to about 1.000"×1.000" have been employed, however other sizes may be employed without varying from the scope of the present concept. It is to be appreciated that such grid-like pattern is not planar, but instead is "distorted" or "stretched" in a three-dimensional manner so as to not be disposed in a single plane.

Enlarged views of a single passage 108, defining wall portions 106 thereof, and debris filter 120 are shown in FIGS. 9, 10, 11 and 12 in order to assist in demonstrating such example embodiment.

Figure 15:
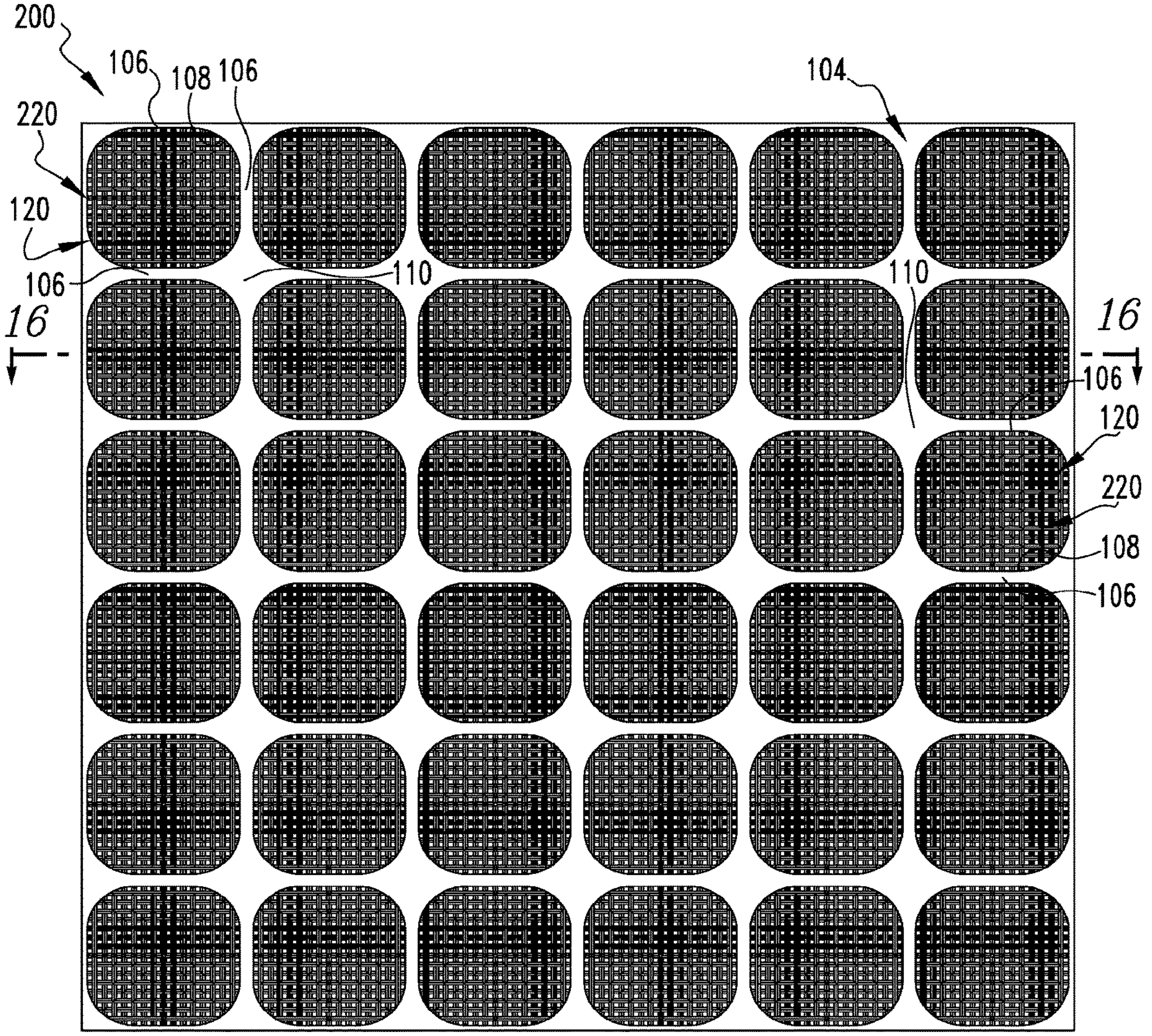
FIG. 15 is a top view of the filtering arrangement of FIG. 13.
Figure 16:
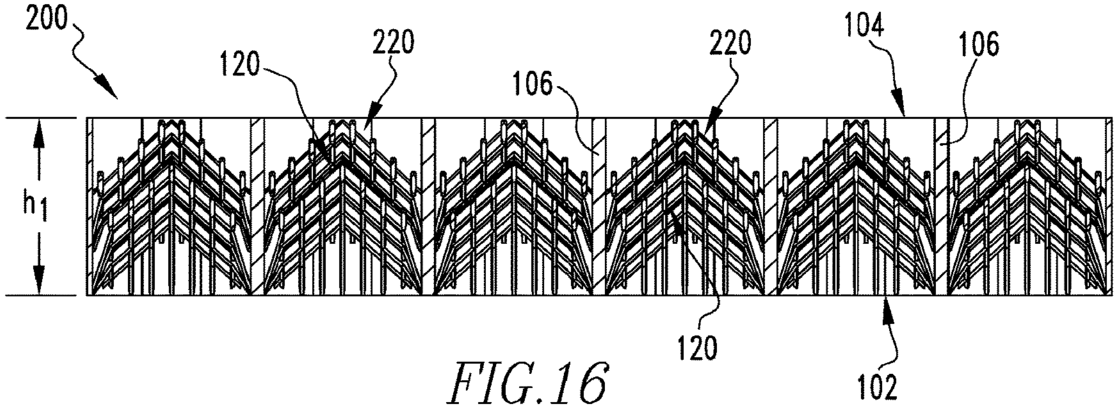
FIG. 16 is a sectional elevation view of the filtering arrangement of FIG. 13 taken along line 16-16 of FIG. 15.
Figure 17:
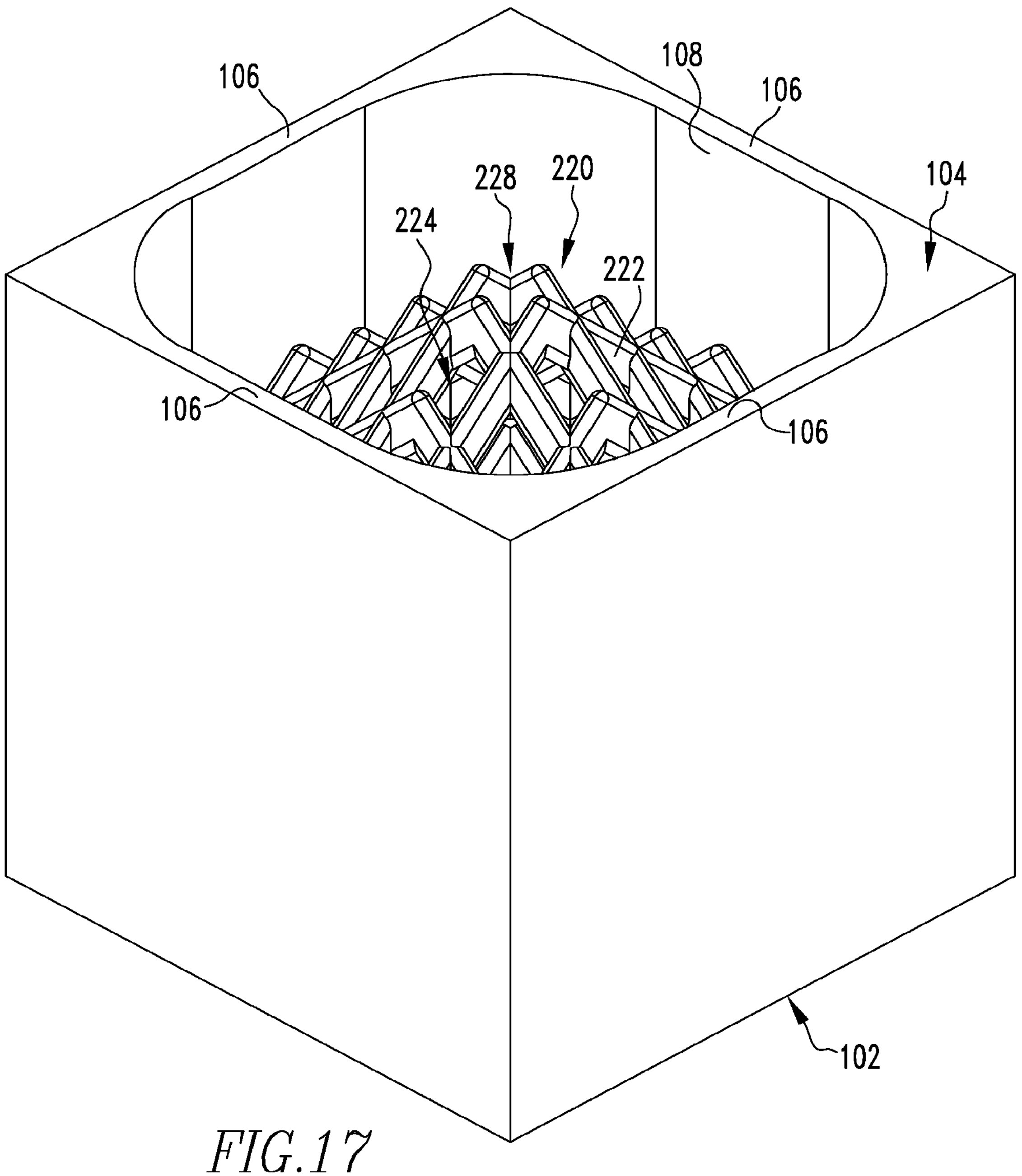
FIG. 17 is an enlarged perspective view of a representative repeating unit of the filtering arrangement of FIG. 13 as indicated at 17.
Figure 18:
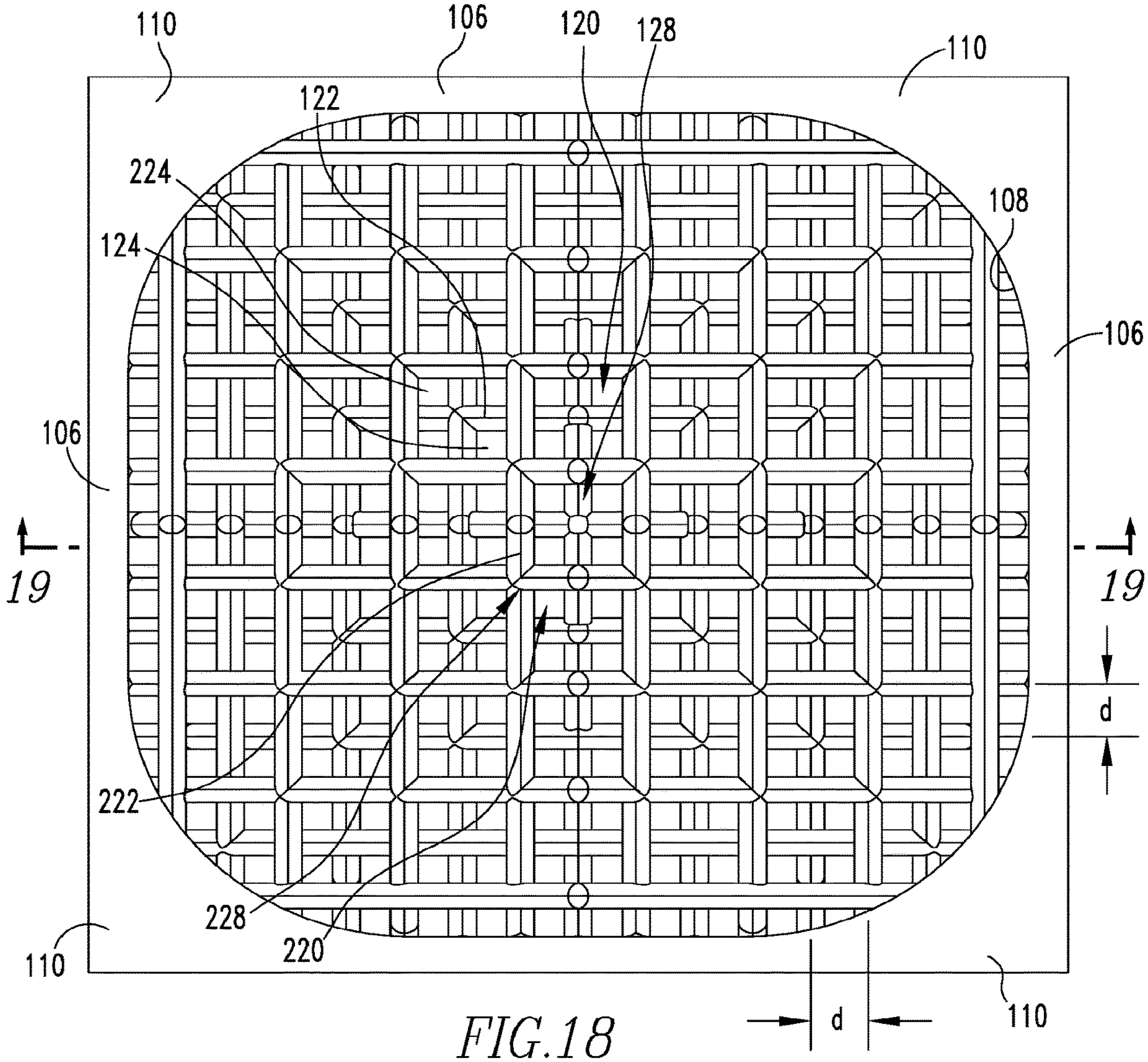
FIG. 18 is a top view of the repeating unit of FIG. 17.
Figure 19:
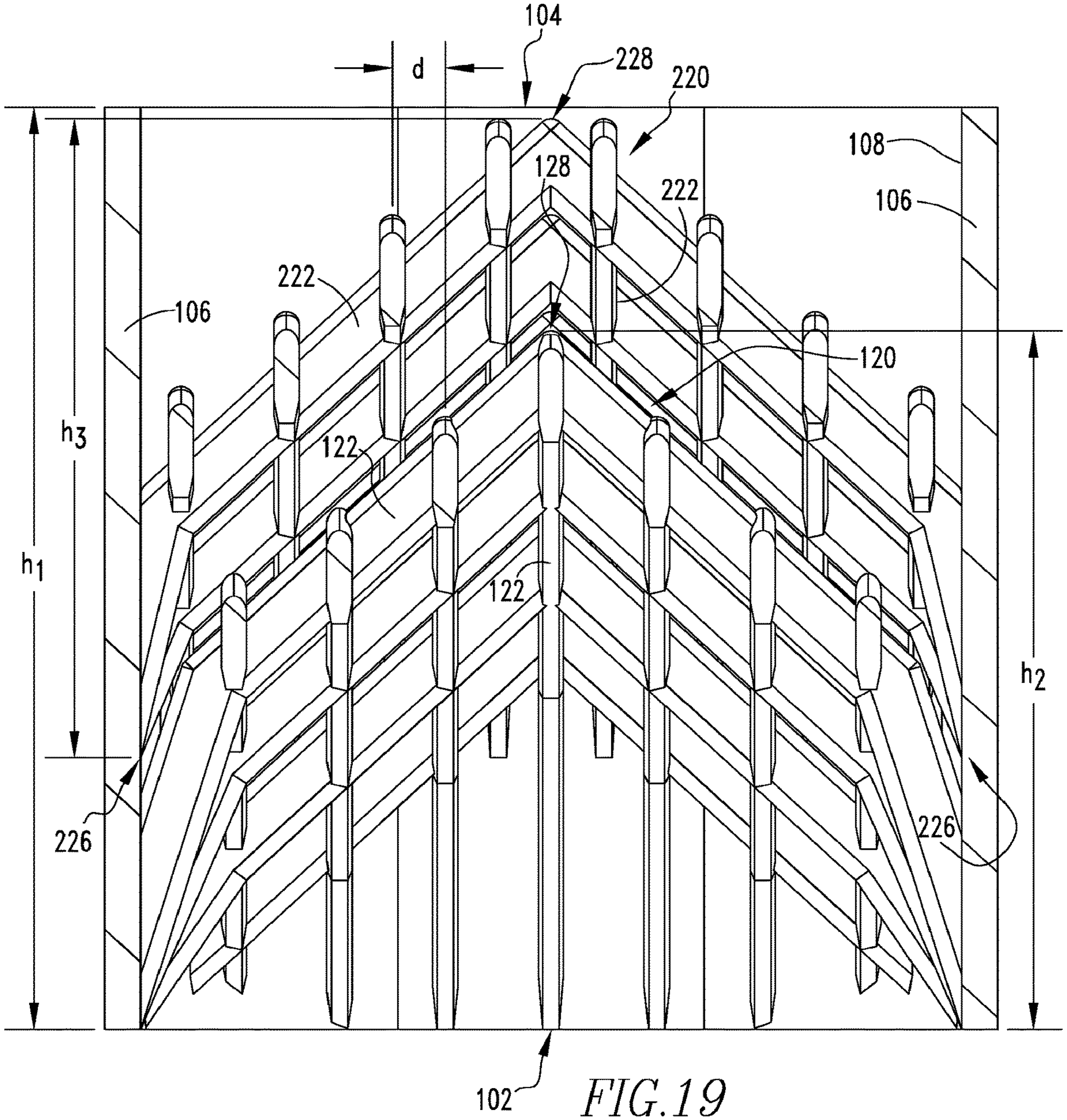
FIG. 19 is a sectional elevation view of the repeating unit of FIG. 17 taken along line 19-19 of FIG. 18.

Another example embodiment of a filtering arrangement 200 in accordance with another exemplary embodiment is shown in FIGS. 13-16, and an enlarged repeating unit thereof is shown in FIGS. 17-19. Filtering arrangement 200 is of a similar arrangement as filtering arrangement 100, and thus similar elements have been identified using the same numbering as previously discussed, and thus will not be described again in detail with filtering arrangement 200. Thus, in accordance with this exemplary embodiment, FIG. 15 is a top view of the filtering arrangement 200. However, in accordance with a variant embodiment, e.g., FIG. 15 may be regarded as a bottom view of a filtering arrangement in which each debris filter 120, 220 is oriented in a "tip down" orientation (i.e., narrowing from the top down) as described heretofore.

In contrast to filtering arrangement 100 which utilized a single debris filter 120, filtering arrangement 200 includes a second debris filter 220 positioned above or below, and generally spaced vertically (typically in a nesting type arrangement) in the range of from about 0.050" to about 0.250" from debris filter 120, thus providing for enhanced debris filtering. In the example embodiment illustrated in FIGS. 13-19, second debris filter 220 is of similar shape and structure as debris filter 120 and thus likewise is formed generally as a hollow pyramid or hollow cone-like structure (or other suitable three-dimensional arrangement) formed from a lattice structure 222 that is sized and configured to minimize resistance in regard to coolant flow through it, and thus minimize pressure drop, while also prohibiting debris larger than a predetermined size (e.g., without limitation, in the range of from about 0.010" to 0.100") from passing through a plurality of apertures 224 defined by lattice structure 222. In example embodiments of the present concept, lattice structures having a width (measured in the horizontal direction) in the range of about 0.005" to about 0.075" and thickness (measured in the vertical direction) in the range of about 0.010" to 0.100" have been employed, although lattice structures of other dimensions may be employed without varying from the scope of the present concept.

Each second debris filter 220 extends a height $h_3$ upward from a base 226 (FIG. 19) thereof, which is spaced upward from bottom surface 102, to an apex portion 228, which may be disposed at, or below, top surface 104. In other words, the combined double layered structured of debris filter 120 and debris filter 220 is positioned between bottom and top surfaces 102 and 104 such that neither debris filter 120 or 220 protrudes beyond either of surfaces 102 or 104. In example embodiments of the present concept, second debris filters 220 having a height $h_3$ in the range of about 0.125" to about 0.600" have been employed, although other heights may be employed without varying from the scope of the present concept. As can be appreciated from the top view of FIG. 15, and the enlarged top view of FIG. 18, lattice structures 222 which form each of second debris filters 220 are likewise formed so as to form a squared grid-like pattern when viewed in a direction parallel to the general flow of coolant through arrangement 200. In example embodiments of the present concept, grid dimensions in the range of from about 0.250"×0.250" to about 1.000"×1.000" have been employed, however other sizes may be employed without varying from the scope of the present concept.

As shown in FIGS. 18 and 19, second debris filter 220 is offset laterally generally a distance d in both the "x" and "y" directions such that the grids of each of lattice structures 122 and 222 generally bisect each other. Such offsetting provides for yet further enhanced debris capturing capability beyond that provided by simply using second debris filter 220 in conjunction with first debris filter 120.

Example embodiments of the invention have been produced via additive manufacturing processes. Accordingly, some or all of arrangements 100 or 200 may be formed as a single unitary element. In an example embodiment, direct metal laser melting has been employed to form embodiments of the invention from Inconel® material. It is to be appreciated, however, that other suitable methods and/or materials (e.g., without limitation, stainless steel, titanium) may be employed without varying from the scope of the invention.

Accordingly, it is to be appreciated that the invention presented herein is a completely new and novel design which incorporates a streamlined flow design which maximizes the flow area in the main body/support structure of the bottom nozzle while incorporating debris capturing fine mesh spire features which may be housed safely within the main body/support structure of the bottom nozzle and thus generally shielded thereby. Such arrangements allow for an effective debris capturing feature without adversely impacting the pressure drop which is primarily driven by the small flow holes in current bottom nozzle designs. With the advanced fine mesh spire debris filtering bottom nozzle design, the additive manufacturing process allows for each of the desired bottom nozzle design features: debris capture, low pressure drop, and robust design, to all be integrated into one advanced bottom nozzle design which could not be easily achieved using existing conventional manufacturing processes. Thus, the advanced fine mesh spire debris filtering bottom nozzle design is a completely new and novel design for use in the nuclear fuel design.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A filtering arrangement for use in a bottom nozzle of a fuel assembly in a nuclear reactor, the filtering arrangement comprising:

a top surface;

a bottom surface;

a plurality of vertical walls arranged in a first squared grid pattern, wherein the plurality of vertical walls extend between the bottom surface and the top surface and define a plurality of passages extending between the bottom surface and the top surface;

a plurality of first debris filters, each first debris filter positioned between the top surface and the bottom surface to span across one of the plurality of passages, wherein each first debris filter comprises a hollow pyramid or hollow cone structure; and a plurality of second debris filters which are each positioned between the top surface and the plurality of first debris filters to span across one of the plurality of passages, and are each in a nesting arrangement with respect to one of the first debris filters.

2. The filtering arrangement of claim 1, wherein the hollow pyramid or hollow cone structure of each first debris filter is formed from a first lattice structure, and wherein each second debris filter comprises a hollow pyramid or hollow cone structure formed from a second lattice structure.

3. The filtering arrangement of claim 2, wherein when viewed from directly above the filtering arrangement or directly below the filtering arrangement the first lattice structure of each first debris filter is arranged so as to form a second squared grid pattern, wherein when viewed from directly above the filtering arrangement or directly below the filtering arrangement the second lattice structure of each second debris filter is arranged so as to form a third squared grid pattern, and wherein the third squared grid pattern is offset a distance from the second squared grid pattern.

4. The filtering arrangement of claim 2, wherein at least one first debris filter narrows from a bottom of the at least one first debris filter to a top of the at least one first debris filter and wherein at least one second debris filter narrows from a bottom of the at least one second debris filter to a top of the at least one second debris filter.

5. The filtering arrangement of claim 2, wherein at least one first debris filter narrows from a top of the at least one first debris filter to a bottom of the at least one first debris filter and wherein at least one second debris filter narrows from a top of the at least one second debris filter to a bottom of the at least one second debris filter.

6. The filtering arrangement of claim 2, wherein the first lattice structure comprises a first plurality of members that cross a second plurality of members, wherein the first plurality of members are interconnected with the second plurality of members, wherein the second lattice structure comprises a third plurality of members that cross a fourth plurality of members, and wherein the third plurality of members are interconnected with the fourth plurality of member.

7. The filtering arrangement of claim 6, wherein the first plurality of members are offset laterally in respect to the third plurality of members, and wherein the second plurality of members are offset laterally in respect to the fourth plurality of members.

8. The filtering arrangement of claim 2, wherein the first lattice structure of each first debris filter defines a first plurality of apertures, and wherein the second lattice structure of each second debris filter defines a second plurality of apertures.

9. A bottom nozzle assembly for use in a fuel assembly in a nuclear reactor, the bottom nozzle assembly comprising:

a rectangular base portion; and a filtering arrangement coupled to the rectangular base portion, wherein the filtering arrangement comprises:

a top surface;

a bottom surface;

a plurality of vertical walls arranged in a first squared grid pattern, wherein the plurality of vertical walls extend between the bottom surface and the top surface and define a plurality of passages extending between the bottom surface and the top surface;

a plurality of first debris filters, each first debris filter positioned between the top surface and the bottom surface to span across one of the plurality of passages, wherein each first debris filter comprises a hollow pyramid or hollow cone structure; and a plurality of second debris filters which are each positioned between the top surface and the plurality of first debris filters to span across one of the plurality of passages, and are each in a nesting arrangement with respect to one of the first debris filters.

10. The filtering arrangement of claim 9, wherein the hollow pyramid or hollow cone structure of each first debris filter is formed from a first lattice structure, and wherein each second debris filter comprises a hollow pyramid or hollow cone structure formed from a second lattice structure.

11. The filtering arrangement of claim 10, wherein the first lattice structure comprises a first plurality of members that cross a second plurality of members, wherein the first plurality of members are interconnected with the second plurality of members, wherein the second lattice structure comprises a third plurality of members that cross a fourth plurality of members, wherein the third plurality of members are interconnected with the fourth plurality of member, wherein the first plurality of members are offset laterally in respect to the third plurality of members, and wherein the second plurality of members are offset laterally in respect to the fourth plurality of members.

12. The filtering arrangement of claim 10, wherein the first lattice structure of each first debris filter defines a first plurality of apertures, and wherein the second lattice structure of each second debris filter defines a second plurality of apertures.

13. The filtering arrangement of claim 9, wherein at least one first debris filter narrows from a bottom of the at least one first debris filter to a top of the at least one first debris filter and wherein at least one second debris filter narrows from a bottom of the at least one second debris filter to a top of the at least one second debris filter.

14. The filtering arrangement of claim 9, wherein at least one first debris filter narrows from a top of the at least one first debris filter to a bottom of the at least one first debris filter and wherein at least one second debris filter narrows from a top of the at least one second debris filter to a bottom of the at least one second debris filter.

15. A filtering arrangement for use in a bottom nozzle of a fuel assembly in a nuclear reactor, the filtering arrangement comprising:

a top surface;

a bottom surface;

a plurality of walls extending between the bottom surface and the top surface to define a plurality of passages extending between the bottom surface and the top surface;

a first debris filter positioned between the top surface and the bottom surface to span across a passage of the plurality of passages, wherein the first debris filter comprises a hollow pyramid or hollow cone structure; and a second debris filter, which is positioned between the top surface and the plurality of first debris filters to span across the passage and is in a nesting arrangement with respect to the first debris filter.

16. The filtering arrangement of claim 15, wherein the hollow pyramid or hollow cone structure is formed from a first lattice structure, and wherein the second debris filter comprises a hollow pyramid or hollow cone structure formed from a second lattice structure.

17. The filtering arrangement of claim 16, wherein the first lattice structure comprises a first plurality of members that cross a second plurality of members, wherein the first plurality of members are interconnected with the second plurality of members, wherein the second lattice structure comprises a third plurality of members that cross a fourth plurality of members, and wherein the third plurality of members are interconnected with the fourth plurality of members.

18. The filtering arrangement of claim 17, wherein when viewed from the top surface or from the bottom surface the first lattice structure is arranged to form a first squared grid pattern, and wherein when viewed from the top surface or the bottom surface the second lattice structure is arranged to form a second squared grid pattern, and wherein the second squared grid pattern is offset a distance from the first squared grid pattern.

19. The filtering arrangement of claim 15, wherein the first debris filter narrows from a bottom of the first debris filter to a top of the first debris filter, and wherein the second debris filter narrows from a bottom of the second debris filter to a top of the second debris filter.

20. The filtering arrangement of claim 15, wherein the first debris filter narrows from a top of the first debris filter to a bottom of the first debris filter, and wherein the second debris filter narrows from a top of the second debris filter to a bottom of the second debris filter.

* * * * *